March 28, 1939. H. D. STECHER 2,152,102
FITTING AND METHOD OF MAKING SAME
Original Filed Jan. 28, 1935
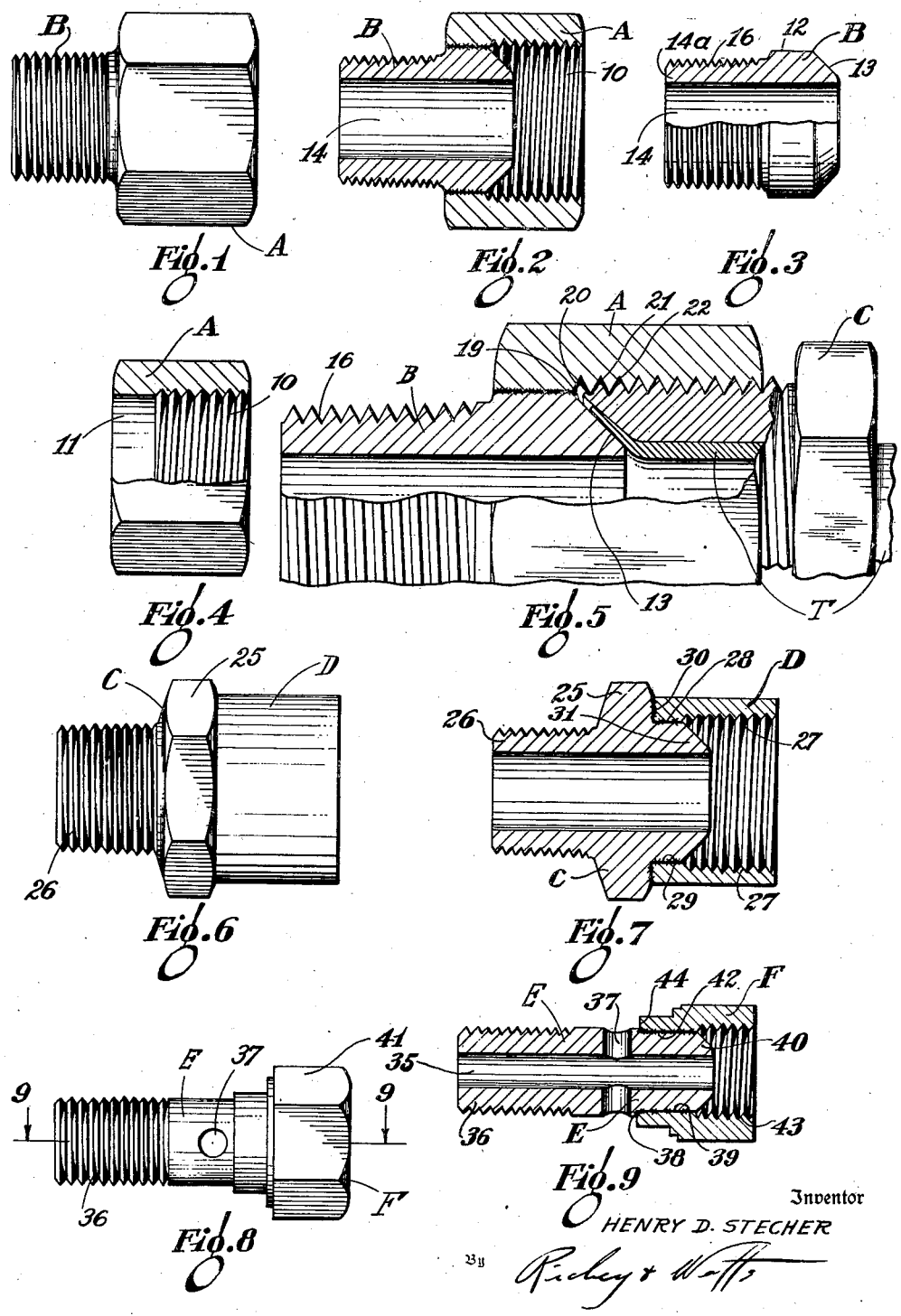
Inventor
HENRY D. STECHER
By Richey & Watts
Attorneys Patented Mar. 28, 1939

2,152,102

UNITED STATES PATENT OFFICE 2,152,102

FITTING AND METHOD OF MAKING SAME

Henry D. Stecher, Lakewood, Ohio, assignor to The Weatherhead Company, Cleveland, Ohio, a corporation of Ohio Application January 28, 1935, Serial No. 3,705
Renewed January 27, 1938

11 Claims. (Cl. 29—157)

This invention relates to fittings and methods of making same, and more particularly to fittings or couplings for pipe or tubes having flared ends. The invention is described herein particularly with respect to fittings of the type disclosed in Patent No. 1,733,925, issued October 29, 1929, to Albert J. Weatherhead, Jr., but the application of my invention to other type of fittings or couplings will be apparent to those skilled in the art. In the said patent there is disclosed a very desirable type of pipe or tube coupling in which the female member comprises a body portion having an internally threaded chamber with an apertured cone projecting upwardly from the base of the chamber. The inverted conical seat engages the flared end of tube or pipe which is clamped against the cone by the male member of the fitting. An important advantage of the coupling disclosed in the said Weatherhead patent is found in the fact that the internal screw threads extend substantially all the way to the base of the chamber, thus making it possible to cut sufficient threads to give the necessary strength with a shorter fitting than in the types of fittings wherein the threads terminate above the base of the chamber. Furthermore, the threads function to support the male coupling member in the region of the greatest strain where there is a tendency to expand the end of the member by reason of the force exerted in clamping the flared tube against the conical seat. In order to further support the male coupling member or coupling nut, the threads at the base of the chamber in the region opposite the perforated cone are preferably tapered to correspond with the tapered threads on the end of the coupling nut.

Couplings of the type disclosed in the Weatherhead patent may be made rapidly and cheaply when the female member is made of brass or other relatively soft and easily machinable material. However, it is impractical to produce in quantity one piece female members according to the Weatherhead patent when steel or other relatively hard material is employed. The difficulty arises from the fact that a hollow tap must be used in order to tap the internal screw threads all the way to the base of the chamber, and such taps do not have sufficient strength to cut relatively hard material such as steel at high production speeds. Also, in some types of fittings it is very difficult to machine the conical seat in steel at high production speeds when the seat is formed integrally with the threaded chamber. Furthermore, making fittings from solid bar stock requires the removal of relatively large amounts of material, and the necessary machining operations are expensive when steel is employed.

It is therefore among the objects of my invention to provide a pipe coupling having an inverted conical seat for the flared end of a tube, and which can be made rapidly and expeditiously of steel or other relatively hard material. Another object of my invention is to provide a pipe coupling of this character which can be formed almost entirely by automatic screw machine operations. A further object is to provide a pipe coupling or fitting composed of two or more parts securely and permanently joined together. Another object is to provide a steel pipe coupling or fitting in which the threads of the female coupling member extend to the base of the chamber in the zone opposite the projecting perforated conical seat. Another object is to provide such a female coupling member having the threads in the zone opposite the conical seat arranged effectively to support and reinforce the male coupling nut. Another object is to provide a method of rapidly and economically making pipe or tube couplings of steel or other hard materials. A further object is to provide a method of producing an effective support for the threads of the male coupling nut adjacent the base of the threaded chamber of the female coupling member.

Further objects and advantages of my invention will become apparent from the following description of various preferred forms thereof, reference being made to the accompanying drawing in which Figure 1 is a side elevation of a preferred form of my fitting; Figure 2 is a sectional view through the fitting illustrated in Figure 1; Figures 3 and 4 are side elevations partially in section, illustrating the component parts of the fittings shown in Figures 1 and 2; Figure 5 is a sectional view on an enlarged scale diagrammatically illustrating the joint between the two sections which go to make up the fitting and showing further the fitting as it appears in use with the flared end of a pipe or tube clamped therein; Figure 6 is an elevation of a modified form of my fitting; Figure 7 is a sectional view of the fitting illustrated in Figure 6; Figure 8 shows a further modification of my fitting; and Figure 9 is a section as indicated by the line 9—9 of Figure 8.

Briefly, my invention contemplates the production of female pipe fittings from two parts which are designed so that they can be produced readily and rapidly and cheaply by automatic screw machine operations from a minimum amount of material. The two parts comprising the fitting are then permanently joined together, preferably by a copper brazing operation, in such a manner that a leak proof joint is formed throughout substantially the entire area of contact and in such a manner that the joint is able to withstand all of the stresses which may be imposed on it in service. I further prefer to carry out the copper brazing operation in such a manner that reinforcing fillet is formed adjacent the base of the conical seat and a copper or alloy seat is formed in the threads of the female fitting to receive the threads of the coupling nut and reinforce the coupling nut in the region adjacent the projecting conical seat.

A preferred form of my fitting, which is illustrated in Figures 1 to 5 of the drawing, may comprise a body portion A having a hexagonal outer surface for convenient engagement by a wrench and an inserted projecting portion B. The body portion A is threaded throughout the major portion of its length as at 10 to receive the male coupling nut C (see Figure 5). The remainder of the body portion A is provided with a cylindrical inner surface 11 which is dimensioned to make a sliding fit with the cylindrical surface 12 of the portion B. The insert B is also provided with a conical surface 13 which forms the seat for the flared end of the tube T, an internal bore or passageway 14 and an extension 15 which may be provided with pipe threads 16 or other convenient means for connection to another part or member.

It will be noted that the portion A can be readily formed by automatic screw machine operations from hexagonal steel bar stock, it being necessary only to drill the bar to the diameter of the cylindrical surface 11, tap the threads 10 and cut off the drilled and tapped section from the bar. The tapping operation can be carried out expeditiously with an ordinary tap producing threads of substantially uniform depth throughout the tapped length of the opening. If necessary, the drilled hole can be reamed to accurate size to obtain a proper fit between the inner cylindrical surface 11 of the part A and the outer cylindrical surface 12 of the insert B.

The insert B may likewise be readily and expeditiously formed from round bar stock in an automatic screw machine, the operations including the drilling of the passageway 14, turning the extension 14a to the proper diameter, cutting the pipe threads 16, turning the cylindrical surface 12 to accurate size, and cutting off the bar with a forming tool which will form the conical surface 13.

After the parts A and B are completed, the complete fitting may be produced permanently joining the parts together in the area of contact of the cylindrical surfaces 11 and 12. This operation is preferably carried out by brazing with copper or other suitable metal in a furnace having a controlled reducing atmosphere. To carry out the brazing operation, the parts are assembled in the manner illustrated in Figure 2, and sufficient copper is supplied to the area between the contacting cylindrical surfaces to form a strong alloy bond throughout the adjacent contacting areas. The copper may be supplied by a number of methods all of which are well known in the art of copper brazing. For example, one or both the parts may be coated with copper either by electroplating or by dipping in a solution of lacquer or other carrier containing copper in powdered form, or the copper may be supplied by small copper pellets or copper wires placed adjacent the contacting surfaces of the two parts.

The properly assembled parts having the necessary copper supplied thereto are then placed in a furnace having a controlled reducing atmosphere and heated to a temperature of about 2150° F. At this temperature and in the proper atmosphere the copper becomes fluid and forms an alloy bond between the two steel parts. The copper is drawn by capillary attraction into all of the spaces between the parts and penetrates the pores of the steel and alloys therewith, so that an extremely strong joint which is leak proof throughout substantially the entire contact of parts is produced.

In order further to strengthen the joint and to provide a seat for the threads of the male coupling nut, I prefer, in carrying out the copper brazing operation to supply copper to the parts in excess of the amount required to bond the parts together so that the excess copper will form a reinforcing fillet at the base of the cone as at 19, and will flow into the threads 10 of the portion A in the region opposite the conical seat 13. Capillary attraction causes the fluid copper to be deposited in the base of the threads, producing a thicker layer of copper at the base, while the peaks of the threads are only slightly coated with copper. Also, the greatest amount of copper is deposited in the region immediately adjacent the joint between the two parts, the deposit of copper gradually becoming of less depth in the threads farther away from the joint.

By this phenomenon, I obtain threads which are in effect tapered as the base of the threaded chamber is approached, the threads adjacent the base of the chamber gradually becoming of less depth. As illustrated diagrammatically in Figure 5, wherein the shading at the joint indicates the weld, a relatively thick layer of copper may be deposited in the lowermost thread as indicated at 20, a lesser amount of copper is deposited in the second thread as indicated at 21, only a slight amount of copper remains in the third thread as shown at 22, while the remaining threads are substantially free of copper. When the male nut C, constructed according to the disclosure of the said Weatherhead patent, is screwed into the chamber, it will be seen that the copper fillets deposited in the bases of the lowermost threads function to engage the tapered end threads of the nut and form an excellent bearing and supporting surface for these threads. The copper apparently is distorted and squeezed out to form a large bearing surface and thereby distributes the load throughout a substantial area of the threads and prevents the expanding forces exerted by the flared tube against the hollow conical surface of the nut from distorting the nut. The copper further tends to lock the nut and prevent it from being accidentally loosened. By this means, I have provided an exceptionally strong fitting in which the end of the tube may be clamped with a high degree of pressure without danger of damaging either the threads adjacent the end in the hollow chamber or of damaging the male coupling nut.

In the form of my fitting illustrated in Figures 6 and 7, the seat carrying portion C is formed integrally with the hexagonal portion 25 and the projecting screw threaded portion 26. The screw threaded chamber of the fitting is produced by the tubular member D having internal screw threads 27 and an internal cylindrical surface 28 which is adapted to be welded to the adjacent cylindrical surface 29 of the member C. The end wall of the member D is likewise adapted to be welded to the adjacent annular surface or shoulder of the member C as indicated at 30. The shoulder functions properly to locate the parts with respect to each other in the assembly operation. The welding operation is preferably carried out in the manner described in connection with the previous modification and in this modification I also prefer to supply sufficient copper to the areas to be welded to insure the formation of a fillet and the deposit of copper in the internal threads of the member D which are opposite the conical seat 31 of the inserted portion C.

In this modification of my invention, the member C may be formed conveniently from hexagonal bar stock by automatic screw machine operations, while the member D may conveniently be formed from round bar stock or from seamless tubing cut to the proper length and internally threaded.

In Figures 8 and 9 of the drawing, I have illustrated a modification which is generally similar to the modification of my invention illustrated in Figures 1 to 5, inclusive, the principal difference between the two modifications lying in the form of the fluid connection provided for the inserted member. In Figures 8 and 9, the inserted member E is provided with a longitudinally extending passageway 35, an externally threaded portion 36, and a transverse fluid passageway 37. This type of fitting is particularly adapted for use in connection with certain automotive hydraulic brake installations.

The insert member E has a small radial shoulder 38 formed thereon, a cylindrical surface 39, and a conical seat portion 40. The internally threaded chamber comprises the member F having outer hexagonal surfaces 41, an inner cylindrical surface 42 adapted to engage the cylindrical surface 39 of the member E, and an internally threaded chamber 43. The parts may be assembled by inserting the member E within the member F so that the cylindrical surfaces 39 and 42 are in contact with each other and so that the flat end surface 44 of the member F engages the shoulder 38 of the member E to locate the parts with respect to each other. Thereafter the parts are preferably joined by welding as before, sufficient copper being supplied during the welding operation to cause some copper to be deposited in the threads 43 opposite the conical seat 40.

It will be noted that in each of the modifications described herein, the welded or brazed joint between the parts comprising the fitting is always placed in shear. Thus referring particularly to Figure 5, the compression exerted by the nut C against the flanged tube T and the conical seat reacts to place the brazed joint between the members A and B in shear in an axial direction, while the torsional strains incident to screwing the pipe threaded portion of the fitting into a support are taken in shear in a circumferential direction in the joint. In the modification illustrated in Figures 6 and 7, the clamping action of a nut against the tube within the fitting exerts a shearing force on the joint in an axial direction, while the tightening of the nut in the chamber exerts a shearing force in a circumferential direction on both the cylindrical welded surfaces and the annular welded surfaces. In addition, the annular welded surfaces assist in preventing the fitting from being pulled apart axially as the joint between the surfaces is placed in tension by the clamping action of the nut on the tube.

The forces exerted on the welded joint in the modification shown in Figures 8 and 9 are substantially the same as the forces described above in connection with Figure 5 of the drawing. However, in addition to the cylindrical joint some further strength is added to the fitting by reason of the welded joint between the annular surfaces 38 and 44.

By reason of the fact that the forces received by my fittings are taken in shear on the welded joints, the joints are amply strong to withstand any forces which might be imposed on the fitting short of forces of such magnitude as to totally destroy the fitting. My tests have indicated that fittings made according to my invention are extremely strong and for all practical purposes are indestructible in use. Furthermore, the parts comprising my fittings can be made up rapidly and economically from inexpensive bar stock by inexpensive machine operations. The assembly of my fittings can be carried out expeditiously by welding with copper or by other convenient methods as will be apparent to those skilled in the art. The deposit of copper obtained in the threads of my fittings assists in supporting the hollow conical end of the coupling nut and in distributing the load throughout substantially the entire area of the threads and results in the production of an exceptionally strong fitting which can be tightened securely on a flanged tube without danger of distortion of the female coupling or of the coupling nut.

It will be obvious to those skilled in the art that various modifications and changes can be made in the fittings and the methods described herein, all without departing from the spirit and scope of my invention. It is therefore to be understood that my patent is not limited to the preferred forms described herein or in any manner other than by the appended claims when given the range of equivalents to which my patent may be entitled.

I claim:

1. The method of making pipe couplings of ferrous material which includes the steps of rotating a piece of bar stock in an automatic screw machine, drilling a central aperture in the bar, forming a screw threaded end and a cylindrical surface on the bar, cutting off the bar to provide a conical projection adjacent one end of the cut off piece, forming a hollow member having an internally threaded portion and an internal cylindrical surface adapted to engage the cylindrical surface on the member formed from bar stock, assembling said tubular member and said member formed from bar stock with their respective cylindrical surfaces in contact, supplying copper to the adjacent cylindrical surfaces, and heating the assembled members in a furnace having a reducing atmosphere to a temperature at which the copper will melt and alloy with the adjacent steel surfaces thereby permanently and securely joining said members.

2. A method of making pipe couplings of ferrous material which includes the steps of forming a hollow member having an internally threaded portion and an internal cylindrical surface, forming a second member having an apertured conical projection and a cylindrical surface adjacent the conical projection adapted to engage the internal cylindrical surface of said first member, said second member also having an annular shoulder adjacent said cylindrical surface adapted to engage an annular surface of said first member, assembling said members with their respective cylindrical and annular surfaces in contact, supplying copper to the adjacent surfaces of said members, and heating the assembled members to a sufficient temperature to permanently and securely join said members together.

3. A method of making pipe couplings of ferrous material which includes the steps of forming a coupling member having an internally threaded chamber, and an apertured cone projecting from the base of said chamber, the threads of said chamber extending into the zone opposite the conical projection, supplying copper to the threads adjacent the base of the chamber and opposite the conical projection, and heating the fitting to a sufficient temperature to cause the copper to alloy with the steel and to coat the threads in the zone opposite the conical projection with a coating increasing in thickness in the zone adjacent the base of the projection.

4. A method of making pipe couplings of ferrous material which includes the steps of forming a hollow member having an internally threaded portion and an internal cylindrical surface, forming a second member having an apertured projecting cone and a cylindrical surface adapted to engage the internal cylindrical surface of said first member, assembling said members with their respective cylindrical surfaces in contact, supplying copper to the contacting surfaces of said members in excess of the amount required to form an alloy bond therebetween, heating the assembled members to a temperature at which the copper will melt and alloy with the ferrous material, the excess copper coating the threads of said hollow member in a zone opposite said projecting conical portion.

5. A method of making pipe couplings of ferrous material which includes the steps of forming a hollow member having an internally threaded portion and an internal cylindrical surface, forming a second member having an apertured projecting cone and a cylindrical surface adapted to engage the internal cylindrical surface of said first member, assembling said members with their respective cylindrical surfaces in contact, supplying copper to the contacting surfaces of said member in excess of the amount required to form an alloy bond therebetween, heating the assembled members to a temperature at which the copper will melt and alloy with the ferrous material, the excess copper forming a fillet between said members adjacent the said alloy bond.

6. A female pipe coupling of the type described having a fluid passage, a screw threaded chamber, a conical projection at the base of the chamber, the screw threads in the chamber extending to the zone opposite the conical projection, said coupling comprising two ferrous parts copper brazed together along contacting cylindrical surfaces coaxial with said screw threaded chamber, the screw threads adjacent the base of said chamber being coated with copper alloyed with the underlying ferrous material, the layer of copper being thicker at the base of the threads than at the peaks of the threads.

7. A female pipe coupling of the type described having a fluid passage, a screw threaded chamber adapted to receive the flared end of a pipe and a male coupling member, a conical projection at the base of the chamber, the screw threads in the chamber extending to the zone opposite the conical projection, said coupling comprising two ferrous parts copper brazed together along contacting cylindrical surfaces coaxial with said screw threaded chamber, there being a fillet at the base of said chamber and the screw threads adjacent the base of said chamber being coated with copper alloyed with the underlying ferrous material, the copper being adapted to form a support for the end of the male coupling member.

8. A method of making pipe couplings of steel or similar material which includes the steps of rotating a piece of hexagonal bar stock in an automatic screw machine, drilling a central aperture in the bar, forming a screw threaded end on the bar having a reduced diameter, cutting off the bar to provide a conical projection and a cylindrical surface adjacent the conical projection, internally threading a tubular member having an internal cylindrical surface adapted to engage the cylindrical surface formed on said bar, coating said tubular member with copper, assembling said tubular member and said member formed from bar stock with their respective cylindrical surfaces in contact and heating the assembled members to a temperature at which the copper will melt in a furnace having a reducing atmosphere whereby the said assembled members are permanently and securely joined together.

9. A method of making pipe couplings of ferrous material which includes the steps of forming a hollow member having an internally threaded portion and an internal cylindrical surface, forming a second member having an apertured conical projection and a cylindrical surface adjacent the conical projection adapted to engage the internal cylindrical surface of said first member, assembling said members with their respective cylindrical surfaces in contact, and thereafter permanently and securely joining said members together by a metallic bond.

10. A method of making pipe couplings of ferrous material which includes the steps of forming a hollow member having an internally threaded portion and a cylindrical surface concentric therewith and having a diameter at least substantially as great as the inside diameter of said threaded portion, forming a second member having an apertured conical projection having a base diameter substantially equal to the inside diameter of said threaded portion, and a cylindrical surface coaxial with the conical projection adapted to engage the cylindrical surface of said first member, assembling said members with their respective cylindrical surfaces in contact, and thereafter permanently and securely joining said members together by a metallic bond.

11. A method of making pipe couplings of ferrous material which includes the steps of forming a hollow member having an internally threaded portion and a cylindrical surface coaxial therewith and having a diameter at least substantially as great as the inside diameter of said threaded portion, forming a second member having an apertured conical projection and a cylindrical surface coaxial with the conical projection adapted to engage the cylindrical surface of said first member, said second member also having an annular shoulder adjacent said cylindrical surface adapted to engage an annular surface of said first member and the inner diameter of said annular surfaces being substantially equal to the base diameter of said conical projection, assembling said members with their respective cylindrical and annular surfaces in contact, and thereafter permanently and securely joining said members together by a metallic bond.

HENRY D. STECHER.